(12) United States Patent
Cova et al.

(10) Patent No.: US 6,384,663 B2
(45) Date of Patent: May 7, 2002

(54) CIRCUIT FOR HIGH PRECISION DETECTION OF THE TIME OF ARRIVAL OF PHOTONS FALLING ON SINGLE PHOTON AVALANCHE DIODES

(75) Inventors: Sergio Cova, Milan; Massimo Ghioni, Monza; Franco Zappa, Sesto San Giovanni, all of (IT)

(73) Assignee: Politecnico de Milano, Milan (IT)

( * ) Notice: Subject to any disclaimer, the term of this patent is extended or adjusted under 35 U.S.C. 154(b) by 0 days.

(21) Appl. No.: 09/798,060

(22) Filed: Mar. 5, 2001

(30) Foreign Application Priority Data

Mar. 9, 2000 (IT) .......................................... MI00A0467

(51) Int. Cl.[7] .............................................. H01L 31/00
(52) U.S. Cl. ................................... 327/514; 250/214 A
(58) Field of Search ................................. 327/514, 515; 250/214 A, 214 LA, 214 LS, 214 SG

(56) References Cited

U.S. PATENT DOCUMENTS 5,705,807 A * 1/1998 Throngnumchai et al. .. 250/214

5,812,030 A * 9/1998 Inami et al. ............ 250/214 A

* cited by examiner

Primary Examiner—Toan Tran
(74) Attorney, Agent, or Firm—Nixon & Vanderhye, P.C.

(57) ABSTRACT

The invention concerns an output circuit for extracting the avalanche pulse produced by an avalanche photodiode for single photon detection (Single Photon Avalanche Diode, SPAD), which makes possible to detect and measure with the best possible precision the time of arrival of an incident photon on the surface of said SPAD. The circuit is built with a coupling network, connected to a terminal of said SPAD biased at high voltage and a comparator. Said network is designed so that the differentiation time constant, introduced by said block, is less than the total duration of the avalanche current pulse, but longer than the risetime of said pulse (FIG. 5 and FIG. 8). The circuit object of the invention has the virtue of being usable in all the circuit configurations for avalanche quenching in SPADs described in the technical and scientific literature.

10 Claims, 5 Drawing Sheets

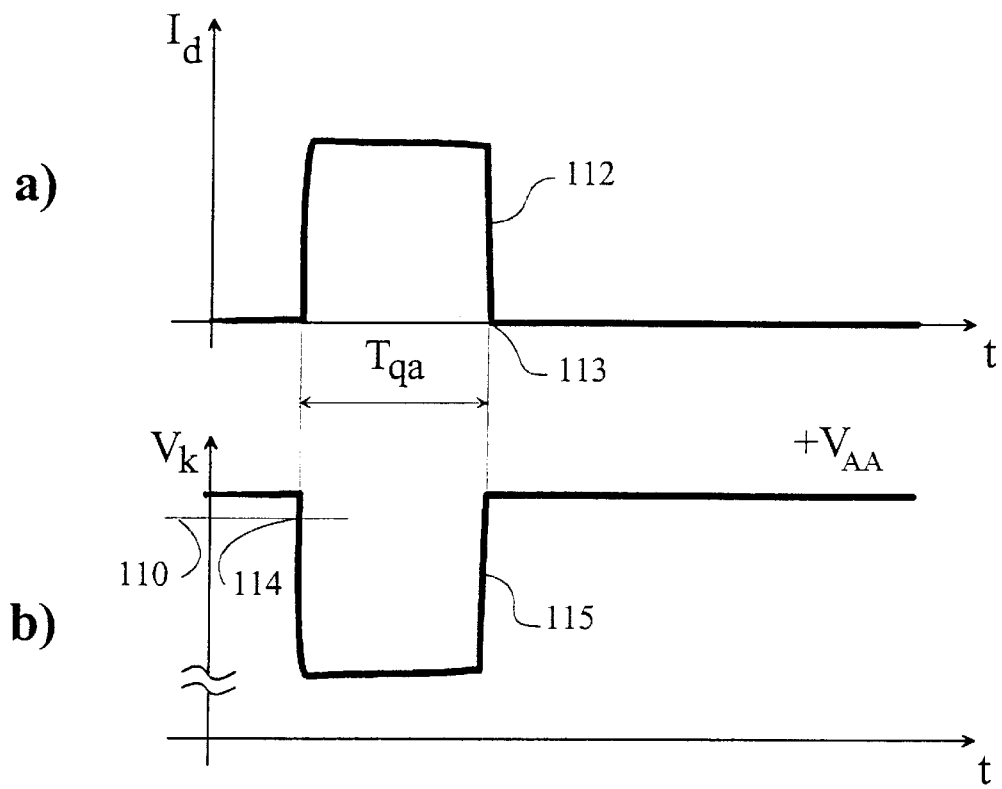
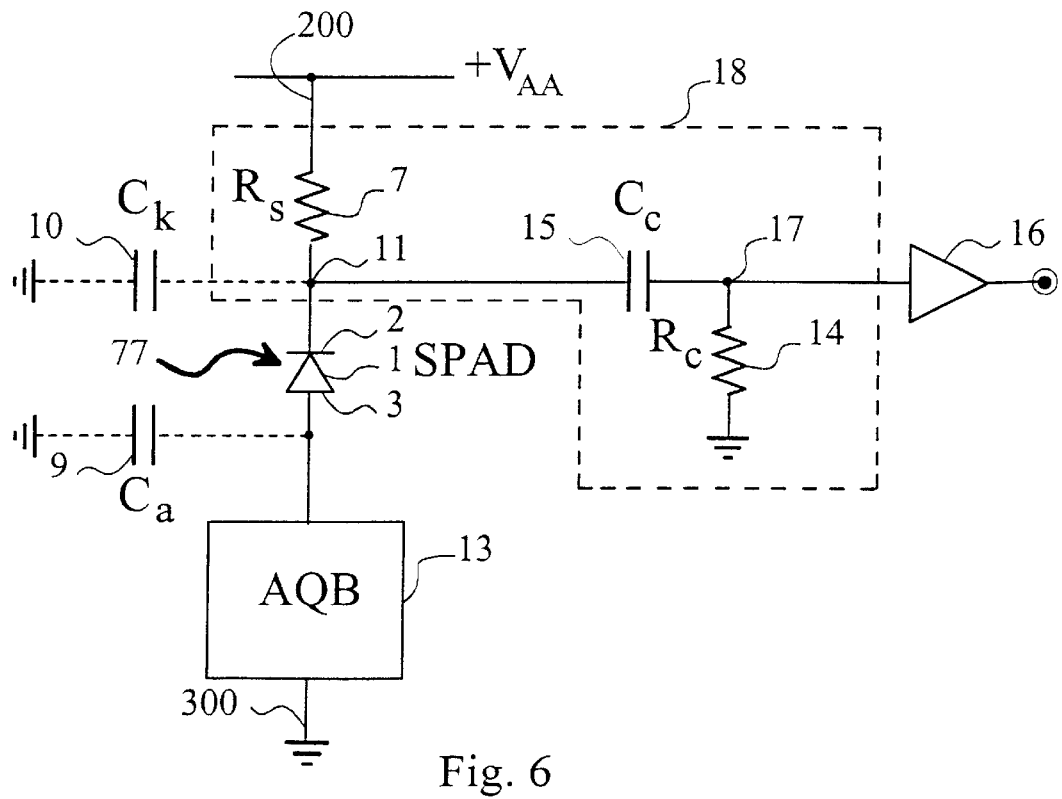
Fig. 6

CIRCUIT FOR HIGH PRECISION DETECTION OF THE TIME OF ARRIVAL OF PHOTONS FALLING ON SINGLE PHOTON AVALANCHE DIODES

FIELD OF THE INVENTION AND BACKGROUND

The present invention regards a circuit for Single Photon Avalanche Diodes (SPAD) to be used in conjunction with an avalanche quenching circuit for high precision detection of the time of arrival of the photon, that is the instant in which the single photon hits the active surface of the detector. The invention in particular regards the field of the technique of Time Correlated Photon Counting, (TCPC) and more generally the field of the techniques that use precision measurements of the time of arrival of photons, such as distance measurements with laser ranging techniques.

Time Correlated Photon Counting TCPC techniques are used for measuring fast and/or weak optical signals in various technical and scientific fields (study of fluorescent emission and decay in science of materials, chemistry, biology, medicine, etc.). Similar techniques based on precision detection of time of arrival of photons are used in various other fields such as: satellite laser ranging; measurement of shape of remote objects with optical radar techniques; quantum cryptography. The time resolution that can be obtained with said techniques is determined by the precision with which the arrival instant of the incident photon on the photodetector is identified. Many applications require to work also with extremely high counting rates (Mc/s, millions of counts per second) keeping the good level of time resolution obtained at low counting rate (kc/s, thousands of counts per second, or less).

The said techniques have been introduced and developed using Photo-Multiplier Tubes (PMT) as detectors of single optical photons.

Special semiconductor devices, single-photon avalanche detectors (SPAD) are at present known and available as detectors of single optical photon. In comparison to the PMTs the SPADs represent a definite progress thanks to their smaller dimensions, lower bias voltage and power dissipation and to their compactness, ruggedness and reliability. Furthermore, they provide higher quantum efficiency and a precision in the detection of arrival time photons, which is comparable with that of the best Micro Channel Plate (MCP) photo-multipliers.

The single photon avalanche detectors are special avalanche photodiodes operating in Geiger mode biased at a bias voltage VAA higher than the breakdown voltage Vbd, that is with an excess bias voltage Vex=|VAA|−|Vbd|>0. At said voltage, a single photon that by hitting the detector frees an electron-hole pair can trigger a self-sustaining process of avalanche multiplication of the charge carriers. The photon thus produces a macroscopic current pulse (typically one milliAmpere or more) with a fast leading edge (typically less than a nanosecond). Said pulse signals the arrival of the photon and indicates with its leading edge the instant of its arrival.

The avalanche current pulse needs to be terminated in order that the device be able to detect other photons in following times. A quenching circuit accomplishes this task by lowering the voltage applied to the photodiode down to the breakdown voltage Vbd or below it. Therefore, in correspondence with a single photon detected, the SPAD produces a current pulse of short duration (typically from ten to some tens of nanoseconds).

Passive Quenching Circuits PQC and Active Quenching Circuits, AQC are known. In the passive circuits PQC the quenching is caused by a high value load resistance, on which the avalanche current itself directly develops the voltage drop that quenches it. In the active circuits AQC a special circuit block (AQB Active Quenching Block) including active devices detects the triggering of the avalanche current and applies to the SPAD a voltage pulse, which lowers the voltage applied to the SPAD down to below the breakdown voltage Vbd.

The main features of the known SPADs reported in the technical and scientific literature can be summarized as follows. Depending on their structure, they can be classified in two categories: thin junction SPADs, by means of which the best time precision has been reached (up to 20 ps picoseconds), that have junction thickness 1 micrometer or a little more, low breakdown voltage (in the range between 15 and 50 V), excess bias voltage Vex up to 10 V or a little more; thick junction SPADs, by means of which a lesser time precision has been reached (up to 150 ps), that have typically a thickness of the junction of 20 micrometers or more, high breakdown voltage (in the range of 120 V to 500 V), excess bias voltage Vex up to some tens Volt. The reported SPAD devices have a photon sensitive area with a diameter in the range from 5 to 500 micrometers, surrounded by a large guard ring not sensitive to photons, which contributes to the electrical capacitance of the junction, that has values in the range between 1 picofarad and about twenty picofarad. When the avalanche current flows, the SPADs have an internal resistance Rd whose value depends on the structure of the device and is in the range from a few hundred Ohm to about 10 Kohm. The value of the avalanche current is given by the ratio between the excess bias voltage Vex and the internal resistance Rd of the SPAD. The risetime of the avalanche current pulse is very fast, and its value depends on the structure of the SPAD and on the value of the excess bias voltage Vex: typically it is shorter than one nanosecond, it can be as low as a hundred picoseconds or it can be longer up to few nanoseconds. From hereon the bandwidth limit of a pulse with risetime Tra will be defined as the reciprocal 1/Tra of said raise time. For the avalanche current pulse of the SPADs the bandwidth limit is typically greater than 1 GHz and it can be higher, up to a few GHz, or be reduced, down to some hundred MHz.

The object of the present invention is to make an output circuit which can be used in conjunction with quenching circuits of various types for operating with any type of SPAD at any bias voltage (VAA voltage even higher than 500 V) and with any pulse counting rate (even high counting rate exceeding 1 Mc/s one million counts per second), which permits to extract the avalanche current signal in such a way that in any operative condition it is possible to identify and measure with high precision the instant of the avalanche triggering, and therefore the instant in which the photon arrives on the active surface of the SPAD.

SUMMARY

In accordance with the present invention, said object is reached by means of a quenching circuit and output circuit for a SPAD photodiode suitable for producing a signal with a risetime of the leading edge almost as rapid as the intrinsic risetime of the leading edge of the avalanche current within the SPAD, therefore in a time range from a few tens of picoseconds to some nanoseconds and having a total duration in a time range from a few nanoseconds to a few tens of nanoseconds, said circuit comprising a comparator for detecting the avalanche pulse that has input connected to an output point of a circuit coupled in alternate current (AC-coupled), which has its input point connected to a first terminal of the SPAD photodiode having the bias voltage applied to it, and means placed between the ground and the second terminal of said SPAD for quenching the avalanche and taking out and counting signals, is characterized in that in said circuit block the circuit elements that constitute it are such to determine a filtering action with a low-pass type cut-off on the high frequency side, with the characteristic cut-off frequency preferably corresponding to a simple pole, that is to a simple integration time constant, and on the low frequency side a high-pass type cut-off, with the characteristic cut-off frequency preferably corresponding to a simple pole, that is to a simple differentiation time constant, and in that the values of the circuit elements are selected so that the value of said high-pass cut-off frequency is less than said low-pass cut-off frequency and less than the bandwidth limit of the avalanche current pulse, but is greater than the value determined by the reciprocal of the duration of said pulse, that is the said differentiation time constant is greater than that of the integration and greater than the rise-time of the avalanche current pulse, but is less than the duration of said pulse.

Furthermore the values of the circuit elements are preferably selected so that the value of said low-pass cut-off frequency is preferably greater than the bandwidth limit of the avalanche current pulse or at least about equal to it, that is the said integration time constant is less than the risetime of the avalanche current pulse or at least about equal to it.

The above mentioned value of the low-pass cut-off frequency and of the corresponding integration time constant is established in order to prevent that the slowdown, that the rate of rise of the leading edge of the output pulse suffers with respect to that of the avalanche current pulse, be significant enough to degrade the precision of the measurement of the arrival time, as is herewith clarified. The above mentioned value of the high-pass cut-off frequency and of the corresponding differentiation time constant is established in order to prevent that at high counting rates the baseline of the output pulses be affected by statistical fluctuations, with a consequent degradation of the precision in the measurement of the arrival time of the photons, as is herewith clarified.

BRIEF DESCRIPTION OF THE DRAWINGS

The characteristics and advantages of the present invention will be apparent from the following detailed description of the known technique and of an embodiment of the invention, illustrated as non-limiting example in the enclosed drawings, in which:

FIG. 5 shows pulse signals in the circuit of FIG. 4;

FIG. 6 shows an electrical network that provides an alternate-current signal coupling (AC-coupling) for the avalanche pulse, constituted by resistors and capacitors and inserted in an active quenching circuit known in itself;

FIG. 1 illustrates the situation of a generic electronic circuit equipped with a comparator that detects the arrival time of a pulse: note the leading edge 101 of the pulse with rise-time Tra, which crosses at point 103 the threshold 102 of a comparator, which is triggered and thus signals the time of arrival.

DETAILED DESCRIPTION

Figure 1:
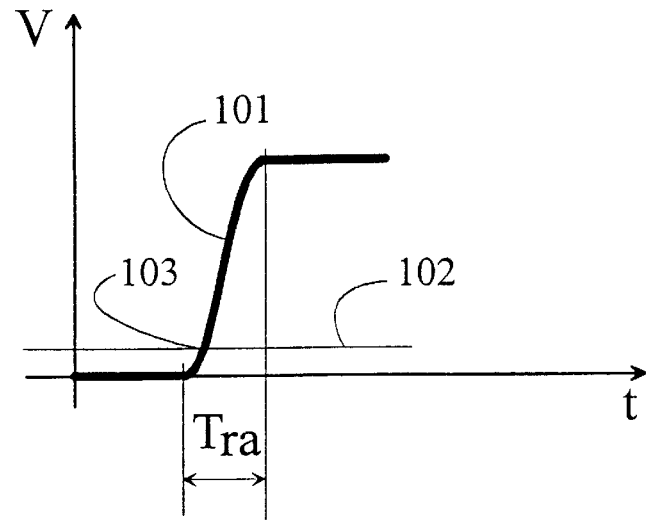
FIG. 1 shows the leading edge of a pulse that arrives at a generic electronic circuit and crosses the threshold of a comparator, which signals the arrival time of the pulse.

In the electronic technique it is well known the solution to the classic problem of detecting with the best possible precision the arrival instant of pulses with standard shape in the presence of electronic noise, which causes statistical fluctuations (time jitter) in the detected arrival time (see for example: Chapter 10 in T. H. Wilmshurst "Signal Recovery from noise in electronic instrumentation", IOP Publishing Ltd, 1990). The circuit comparator and the filtering and/or low noise amplification circuits that precede the comparator are selected and dimensioned so as to minimize the time that the pulse takes to cross a band around the threshold with an amplitude defined by the noise intensity, measured by the noise root-mean-square value. The selection of the circuit configuration and of the parameter values takes into account both the pulse rising slope obtained in correspondence to the threshold crossing and the intensity of the noise. In the best solution according to the known art it can occur that the selected threshold level be fairly high, that is, that the pulse crosses the threshold not with the initial part of its leading edge, but at a successive point (for example at half-height of its leading edge) and that the filtering and amplification band be limited on the high frequency side by a low-pass filtering with characteristic frequency lower than the bandwidth limit of the original pulse before filtering.

The case of SPAD photodiodes is considerably different compared to the classical problem above mentioned, as the shape of the leading edge of the avalanche current pulse in the SPAD is not standard, but intrinsically affected by statistical fluctuations. In the initial phase said intrinsic fluctuations of the rise of the pulse are small, because the avalanche current rises while remaining confined within a small area around the point at which the photon has been absorbed and has triggered the avalanche. Successively, after the number of carrier pairs (electrons and holes) is grown up reaching a few thousand and the value of the avalanche current has correspondingly reached a level of a few tens of microAmpere, the current increases by progressively propagating to the rest of the area of the junction through physical phenomena with statistical features and consequently the jitter of the rising signal grows rapidly (for example see: A. Spinelli, A. Lacaita "Physics and Numerical Simulation of Single Photon Avalanche Diodes" IEEE Trans. Electron Devices, Vol.44, pp. 1931–1943 (1997)).

Differently from the known solution to the said classical problem, in the case of the SPAD photodiodes the comparator circuit and the filter and/or low noise amplifier circuits that precede the comparator and their parameter values must be selected so that also the jitter of the threshold crossing time caused by the intrinsic fluctuations of the pulse rise be minimized. Therefore the comparator threshold must be crossed by the pulse during the initial part of its rise, in which the intrinsic fluctuations of the avalanche current are still small. The conditions necessary for attaining this goal are:

(A) the filtering and/or low noise amplifier circuits that precede the comparator must only slightly slow down the initial rise of the pulse compared to the intrinsic rise of the avalanche current pulse in the SPAD, that is said circuits must have an upper limit of the pass-band greater than the bandwidth limit of the avalanche current pulse of the SPAD and it is preferable that said band limit of the circuits corresponds to a simple pole, with integration time constant less than the intrinsic rise time of said avalanche current pulse;

(B) the threshold of the comparator must be very low, that is its distance from the base line of the pulse must be much smaller than the pulse amplitude.

Therefore it is necessary to examine how is it possible to fulfill the said conditions in the SPAD quenching circuits.

Figure 2:
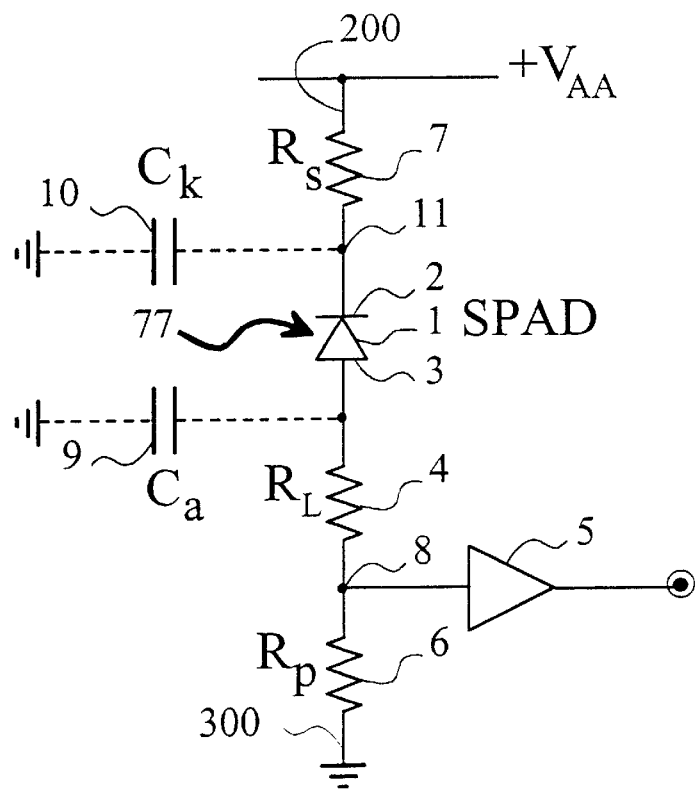
FIG. 2 shows a passive quenching circuit of a SPAD photodiode according to the known technique.

A passive quenching circuit according to the known technique is shown in FIG. 2. According to what is illustrated in said Figure it can be seen that a SPAD 1 photodiode has an anode terminal 3 connected to the circuit node 300 by means of a resistor 4, called load resistor RL, with a much higher value than the internal resistance of the SPAD, that is typically in the range from 100 Kohm to a few Mohm, and in series with it a resistor 6 called pull-up resistor Rp, of a low value, typically in the range between 50 ohm and 5 Kohm, and the circuit node 300 is grounded. The input of a comparator 5 is connected between said resistors at the intermediate point 8. A capacitor 9 with capacitance Ca represents the total capacitance between the anode 3 and ground. A cathode terminal 2 of the SPAD can be connected through a resistor 7, called signal resistor Rs, with a low value, typically in the range between 5 and 500 ohm, to a circuit node 200 connected to the bias voltage +VAA or directly to said circuit node 200. A capacitor 10 with capacitance Ck represents the total capacitance between the cathode 2 and ground. Said capacitances Ca and Ck result from the capacitance of the SPAD diode and from the stray capacitance of the connections, and their value is between a few picofarad and a few tens of picofarad, according to the circuit components connected to the electrode of the SPAD and to the different circuit construction techniques. Therefore the total capacitances Ca and Ck typically have values between 5 and 20 pF.

Figure 3:
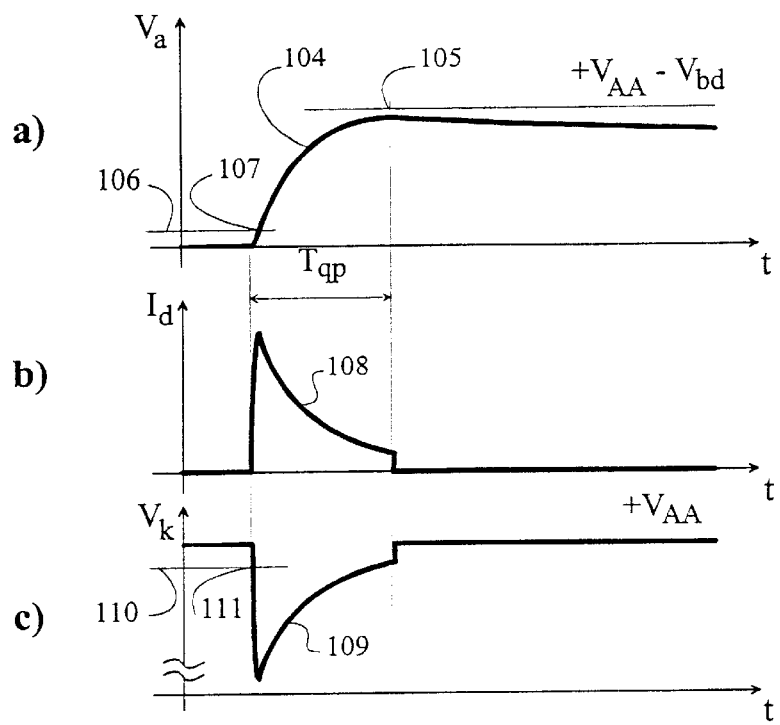
FIG. 3 shows a group of pulse signals in the circuit of FIG. 2.

FIG. 3 shows a time diagram of a series of electrical signals which are generated in the circuit of FIG. 2 following the absorption of the photon 77 which triggers an avalanche in the SPAD.

FIG. 3($a$) represents the behavior 104 of the voltage Va of the anode 3. The voltage pulse at point 8 of the circuit of FIG. 2 is a replica of said anode voltage pulse with amplitude attenuated by the divider made by the resistors 4 and 6; therefore FIG. 3($a$) with a different vertical scale of voltage represents said pulse read at point 8. FIG. 3($a$) shows the threshold 106 of the comparator 5 which the pulse crosses at point 107 of its rise, generating a pulse at the output of the comparator, that can be used by successive electronic instruments which count the pulses or that records the time of arrival.

FIG. 3($b$) shows the behavior 108 of the avalanche current and FIG. 3($c$) shows the behavior 109 of the voltage of terminal 11 of the resistor 7 in FIG. 2.

It can be seen that the resistor 4 RL, since it is much greater than the internal resistor Rd, acts as quenching element of the avalanche triggered by the incident photon 77 on the SPAD 1 because, as it is shown in FIG. 3($a$), the avalanche current generates on the resistor 4 RL a pulse that makes the voltage of the anode 3 to rise until it almost reaches level 105 equal to (+VAA−Vbd), thus reducing the voltage applied between cathode 2 and anode 3 of the SPAD photodiode 1 to a value near to the breakdown voltage Vbd. Said pulse is generated by the avalanche current through a filtering action due to the network constituted by the capacitance 9 Ca, by the load resistor 4 RL and by the internal resistor Rd of the SPAD 1 in avalanche. Said filtering is an integration with time constant τa given by the product of Ca and of the resistor RL//Rd resulting from the parallel between the resistors RL and Rd, that is in practice by: τa=Rd*Ca. The value of the constant τa results to be in the range between 2 and 100 nanoseconds and is therefore definitely greater than the rise time of the avalanche current, as illustrated in the FIGS. 3($a$) and 3($b$). The signal taken at point 8 therefore does not satisfy the condition (A).

It can be seen in FIG. 3($c$) that for the said purpose the voltage signal on the resistor 7, taken from point 11 in FIG. 2, results to be more suitable because differently from RL it is possible to select a low value for the resistor 7 Rs, less than that of the internal resistor Rd of the SPAD. The above mentioned signal is generated by the avalanche current through an integration filtering due to the network constituted by the capacitance 10 Ck, the signal resistor 7 Rs and the internal resistor Rd of the SPAD. The time constant τk of the filtering is given by the product of Ck and of the resistor Rs//Rd, that is the parallel between the two resistors called Rs and Rd. By selecting Rs of a lesser value than Rd we obtain: τk=Rs*Ck and therefore the condition (A) can be fulfilled obtaining a time constant τk shorter than a nanosecond and therefore less than the rise time of the avalanche current or at least about equal to it. In order to satisfy also the condition (B), the input of a comparator with threshold 110 near to the base line of the pulse must be connected to the point 11 in FIG. 2, as shown in FIG. 3($c$). It can be seen, however, that in the PQC circuit in FIG. 2 the point 11 is biased at a high voltage VAA, which is not admissible at the input of a comparator circuit. Nevertheless this obstacle can be easily avoided by resorting to a negative bias voltage for the SPAD, that is, by introducing the following changes in the circuit diagram of FIG. 2: the circuit node 300 is connected to the voltage −VAA (negative supply with absolute value equal to +VAA) instead of to ground and the circuit node 200 is connected to ground instead of to positive voltage +VAA. Point 11 thus results biased at ground voltage and the input of a comparator with low threshold can be connected to it, thus fulfilling the condition (B).

In the passive circuits PQC the precision obtained in measuring the pulse arrival time can be optimized by using the above described solution, but the interest in this result is limited because anyway the PQCs are inherently not very suitable for the said purpose. In fact, the slow rate with which the voltage applied to the SPAD goes back to the operative voltage VAA after every quenching causes a progressively increasing deterioration of the precision in measuring the arrival time as soon as the counting rate of the pulses exceeds a thousand pulses per second (see S. Cova, M. Ghioni, A. Lacaita, C. Samori, F. Zappa "Avalanche photodiodes and quenching circuits for single photon-detection" Appl. Optics., 35, 1956–1976 (1996)).

In order to overcome the limitations of the PQC circuits and improve the performance obtainable with SPAD photodiodes the active quenching circuits AQC have been introduced.

Figure 4:
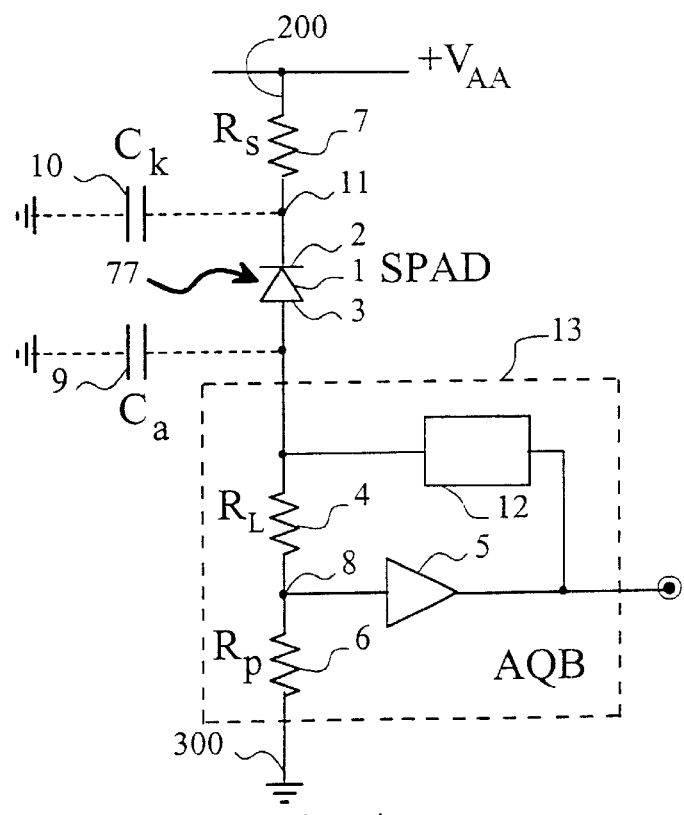
FIG. 4 shows an active quenching circuit according to the known technique.

As can be seen in FIG. 4, in an AQC the quenching element of the avalanche, triggered by a photon 77 incident on the SPAD, is a special circuit block 13 including active devices, called Active Quenching Block AQB. As a non-limiting example, a frequently used known AQB configuration is illustrated in FIG. 4, obtained by adding a special circuit 12 to the PQC circuit configuration in FIG. 2, with the input connected to the output of comparator 5 and the output connected to the terminal 3 of the SPAD. The leading edge of the signal in point 8 triggers the comparator 5 that commands circuit 12, which generates a positive voltage signal of such amplitude to quench the avalanche, and said signal is applied to the SPAD with a delay Tqa with respect to the beginning of the avalanche (quenching delay), and keeps it quenched for a preset length of time Tho (hold-off time) and finally brings back the voltage to ground, thus re-establishing the initial bias conditions of the SPAD (active reset).

As can be seen in FIG. 5(*a*), the pulse 112 of avalanche current has a duration 113 which is determined by the value of the delay Tqa, which has a value preset by the circuit, between a minimum corresponding to the transit time in the circuit, typically about 10 nanoseconds, and a maximum of some tens of nanoseconds.

All the known circuit configurations with which the block 13 AQB can be made, including that illustrated in FIG. 4, include active electronic devices and therefore do not permit connection either of their input or of their output with points biased at high voltage. Therefore, both the connections of the AQB to the SPAD must in any case be made with the terminal of the SPAD biased at ground voltage (or at the most at a voltage of a few Volt, small enough to be tolerable for the AQB circuit itself). Said connections of the AQB, however, increase the total capacity of said terminal and in addition many of the known AQB configurations do not permit the connection of a low value resistor to their output and/or to their input and therefore they inhibit to connect a low value resistor between the terminal of the SPAD to which they are connected and ground. Consequently it is not possible to satisfy the condition (A) for the signal taken at the terminal of the SPAD biased at ground voltage.

It can be seen that in the AQC circuit in FIG. 4 a signal resistor Rs is connected between the terminal 2 of the SPAD and the bias voltage VAA, exactly as it is in the PQC circuit in FIG. 2. The value of this resistor can be selected as said in the PQC case of FIG. 2 and therefore also in the AQC case of FIG. 4 it is possible to satisfy the condition (A) for the voltage signal 115 at point 11. In fact it can be noted in FIGS. 5(*a*) and 5(*b*) that said signal 115 has practically the same shape as that of the avalanche current pulse 112 in the SPAD. Point 11 of the AQC circuit in FIG. 4 is biased at the high voltage VAA as in the circuit PQC of FIG. 2, but the presence of the AQB in this case inhibits to employ the solution used in the case of the PQC for avoiding the obstacle, because applying a negative bias voltage −VAA to terminal 3 is incompatible with the AQB connected to it.

The known technique for connecting the comparator to point 11 biased at high voltage VAA, as shown in FIG. 6, consists of placing an AC-coupling network 18 (coupling in alternate current) which faithfully transmits the pulse and prevents the passage of direct current. It can be noted in FIG. 6 that between the terminal 11 of the resistor 7, connected with the other end to the circuit node 200 biased at the voltage +VAA, and the input 17 of the comparator 16 a coupling capacitor 15 with capacitance Cc is connected and a coupling resistor 14 Rc is connected between the input 17 of the comparator 16 and ground. At the input 17 of the comparator 16 the avalanche current produces a voltage pulse through the filtering given by the network constituted by Rs, Cc and Rc. Said filtering has a low-pass cut-off corresponding to an integration time constant given by: $\tau k=(Rs//Rc//Rd)*Ck$, where (Rs//Rc//Rd) is the value of the resistor resulting from the parallel of Rs, Rc and Rd. With a low value of the resistor Rs and/or Rc the integration time constant can be made lower than or at least about equal to the avalanche current risetime, thus fulfilling the condition (A) as in the previously seen cases. The filtering given by the network 18 also produces a high-pass cut-off corresponding to a differentiation time constant given by $\lambda=(Rc+Rs//Rd)*Cc$, where Rs//Rd is the value of the resistor resulting from the parallel of Rs and Rd.

According to the known technique the value of the differentiation time constant $\lambda$ must be much greater than the duration Tqa of the pulse generated by the SPAD, so as to faithfully transmit said pulse. In this way at the input 17 of the comparator 16 there is a replica of the voltage pulse 115 at point 11 in FIG. 4, but with base line at ground voltage, and it is thus possible to fulfill the condition (B) for the threshold of the comparator. A typical example of selection of the circuit parameter values according to the known technique, that produces a differentiation constant $\lambda$ of about 30 microseconds, is the following:

Rs=100 Ohm

Rc=500 Ohm

Cp=47 nanoFarad.

Figure 7:
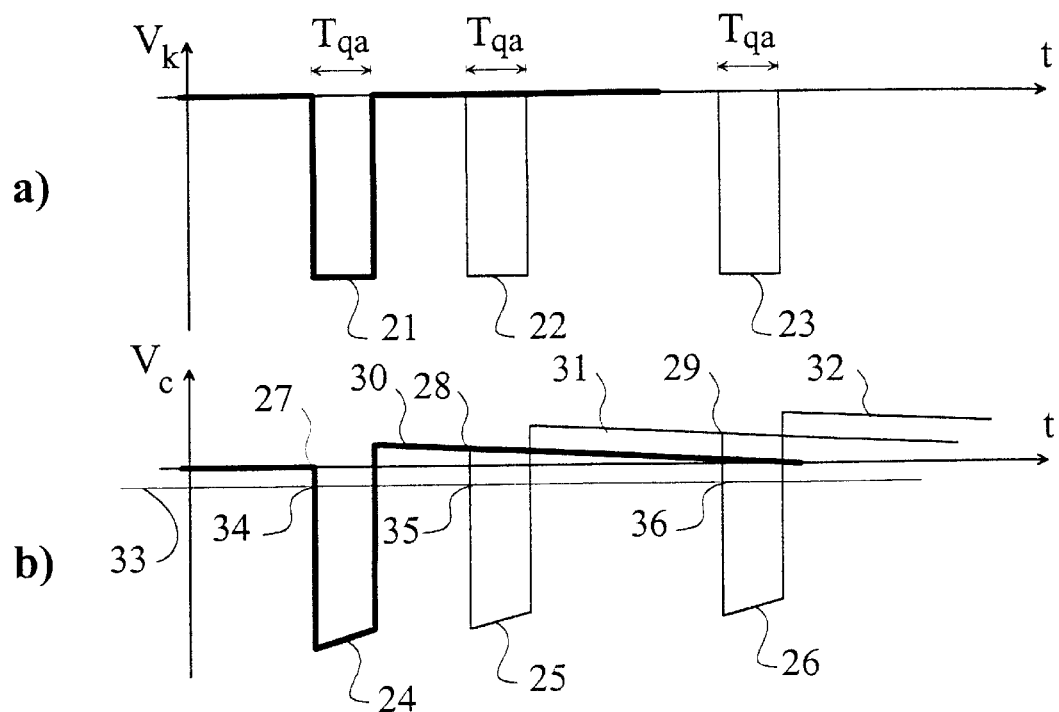
FIG. 7 illustrates a series of pulses obtained at the output of the AC-coupling network in the circuit of FIG. 6 with values of the circuit elements selected according to the known art.

However, the solution with coupling in alternate current according to the known art is unsuitable for the said purpose, because when the counting rate exceeds a few thousands pulses per second (kcps) a progressively increasing deterioration of the time precision occurs as illustrated in FIG. 7.

In FIG. 7(*a*) an X-axis indicating the time and a Y-axis indicating the voltage at point 11 of FIG. 6 in the presence of a sequence of pulses 21, 22 and 23 generated by the SPAD photodiode 1 can be seen.

In FIG. 7(*b*) an X-axis indicating the time can be seen as in FIG. 7(*a*) and a Y-axis indicating the voltage after the AC-coupling at point 17 of FIG. 6 in presence of the pulses 24, 25 and 26, which correspond to the said pulses 21, 22 and 23. In FIG. 7(*b*) it can be noted that the differentiation adds to each pulse 24, 25 and 26 a tail with opposite polarity 30, 31 and 32 and long duration, with area equal to the pulse and slowly decreasing amplitude, precisely with exponential decrease with the characteristic time constant $\lambda$ of the differentiation. Given that the pulses are randomly distributed in time, it can be seen that in correspondence with the arrival instants 27, 28 and 29 of the pulses 24, 25 and 26 the amplitude of the sum of the tails due to previous pulses is randomly variable and therefore the threshold 33 of the comparator 16 is crossed by the pulses at points 34, 35 and 36 situated at different heights along their leading edge, that is, it is crossed with a delay in comparison with the beginning of the pulse which is not constant, but includes additional delays with randomly fluctuating values, corresponding to various fractions of the pulse rise-time.

Figure 8:
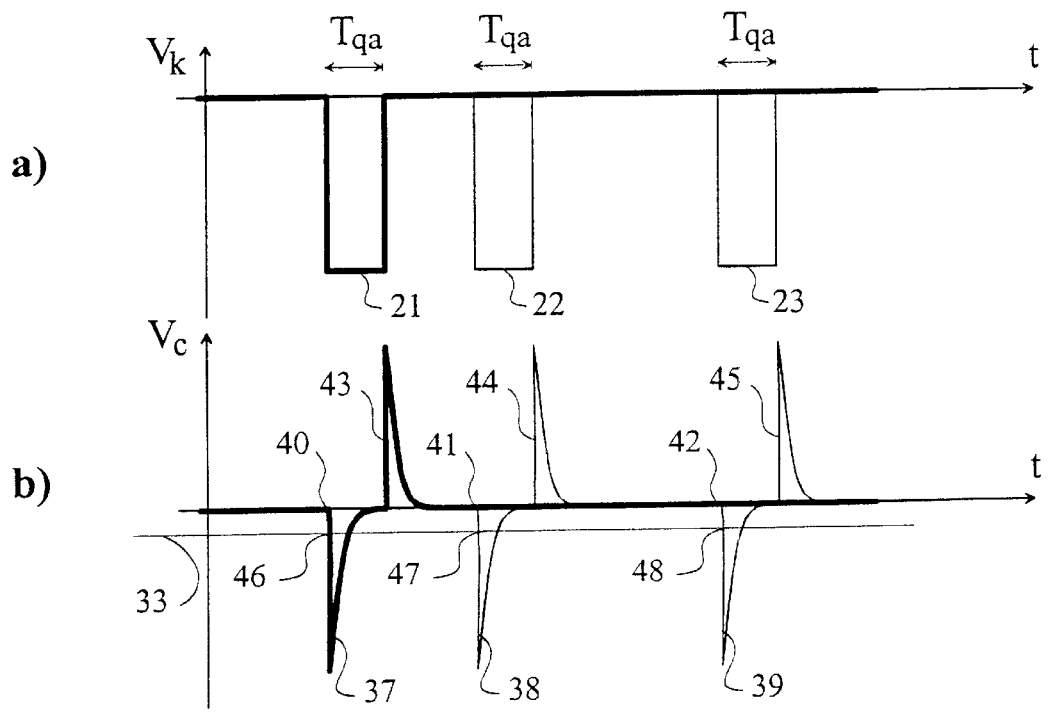
FIG. 8 shows a series of pulses obtained at the output of the AC-coupling network in the circuit of FIG. 6 with the values of the circuit elements selected according to the present invention.

The Applicant has found that a radically different selection of values of the circuit components of the coupling network 18 in alternate current remarkably modifies the transmitted pulse shape, as it makes the differentiation time constant $\lambda$ of the network shorter than the duration of the avalanche current pulse, as illustrated in FIG. 8. A typical example of selection of the circuit parameter values according to the innovative technique, which produces a differentiation constant $\lambda$ of about 3 nanoseconds, is the following:

Rs=100 Ohm

Rc=500 Ohm

Cp=4.7 picoFarad.

With this radically different selection of the circuit components values of the network 18 the integration time constant of the passive filtering, still given by $\tau k=(Rs//Rc//Rd)*Ck$, is made short enough to satisfy the condition (A) by selecting Rs and/or Rc of low value; at the same time, by suitably selecting the value of the capacitance 15 of coupling capacitor Cc, the differentiation time constant $\lambda=(Rc+Rs//Rd)*Cc$ is made definitely shorter than the duration Tqa of the avalanche current pulse, keeping it however longer than the rise-time of said pulse. As it has already been said, the duration Tqa is in the range from about 10 to some tens of nanoseconds and therefore the value to be adopted for the differentiation time constant $\lambda$ will be between one and a few nanoseconds.

FIG. 8 shows a series of pulses generated after the coupling in alternate current at point 17 of the circuit of FIG. 6 according to the inventive selection of values of the circuit parameters in the coupling network 18. FIG. 8(a) represents the same sequence of pulses represented in FIG. 7(a).

In FIG. 8(b) an X-axis indicating the time as in FIG. 8(a) and a Y-axis indicating voltage at point 17 in FIG. 6 in the presence of the pulses can be noted, which with the inventive selection of values of the circuit parameters in the coupling network 18, correspond after the coupling in alternate current to said pulses 21, 22 and 23. In FIG. 8(b) it can be noted that after the coupling network, in correspondence with the leading edge of every pulse generated by the SPAD 21, 22 and 23, a short exponential pulse is produced 37, 38 and 39, which has a leading edge which is practically the same as that of the pulse generated by the SPAD, followed by a rapid exponential decay with time constant $\lambda$. It then can be further noted that in correspondence with the trailing edge of every pulse generated by the SPAD 21, 22 and 23 a secondary pulse is generated, practically equal to the pulse corresponding to the leading edge, but with opposite polarity 43, 44, 45.

Furthermore, it can be noted that given the small value of the time constant $\lambda$ said secondary pulse of opposite polarity decreases down to negligible amplitude in a short time, that can be made so brief that it be completely covered by the finite dead time, that in all the known AQC follows every avalanche pulse and has duration from 30 nanoseconds upwards, depending on the operation of the AQC. Consequently it can be noted that in correspondence with the arrival times 40, 41 and 42 of the pulses 37, 38 and 39 the base line is not shifted by tails due to previous pulses and, therefore, that the threshold 33 of the comparator 16 is crossed by the pulses at points 46, 47 and 48 situated at the same height along the leading edge, that is it is always crossed with the same delay with respect to the beginning of the pulse and there are no additional delays with fluctuating value.

In addition to what has been previously said the selection of values of the circuit components of FIG. 6 is preferably such to define a low threshold of the comparator 16, at a level corresponding to an avalanche current of the SPAD 1 of about 200 microampere or less. In this way the triggering threshold of the comparator is crossed by the first part of the rise of the avalanche current pulse, in which the intrinsic fluctuations are smaller.

The present invention can be implemented with variants in the circuit configuration, which any circuit designer can devise relying on his normal skill and of which some cases are herewith pointed out as an non-limiting examples.

The coupling network in alternate current 18 with capacitive coupling, made of resistors and capacitors according to the inventive selection of values, can be replaced by other linear networks made of different components which provide the same transfer function, that is, which produce a low-pass filtering (approximate integration) and a high-pass filtering (approximate differentiation) with parameter values selected as described.

Figure 9:
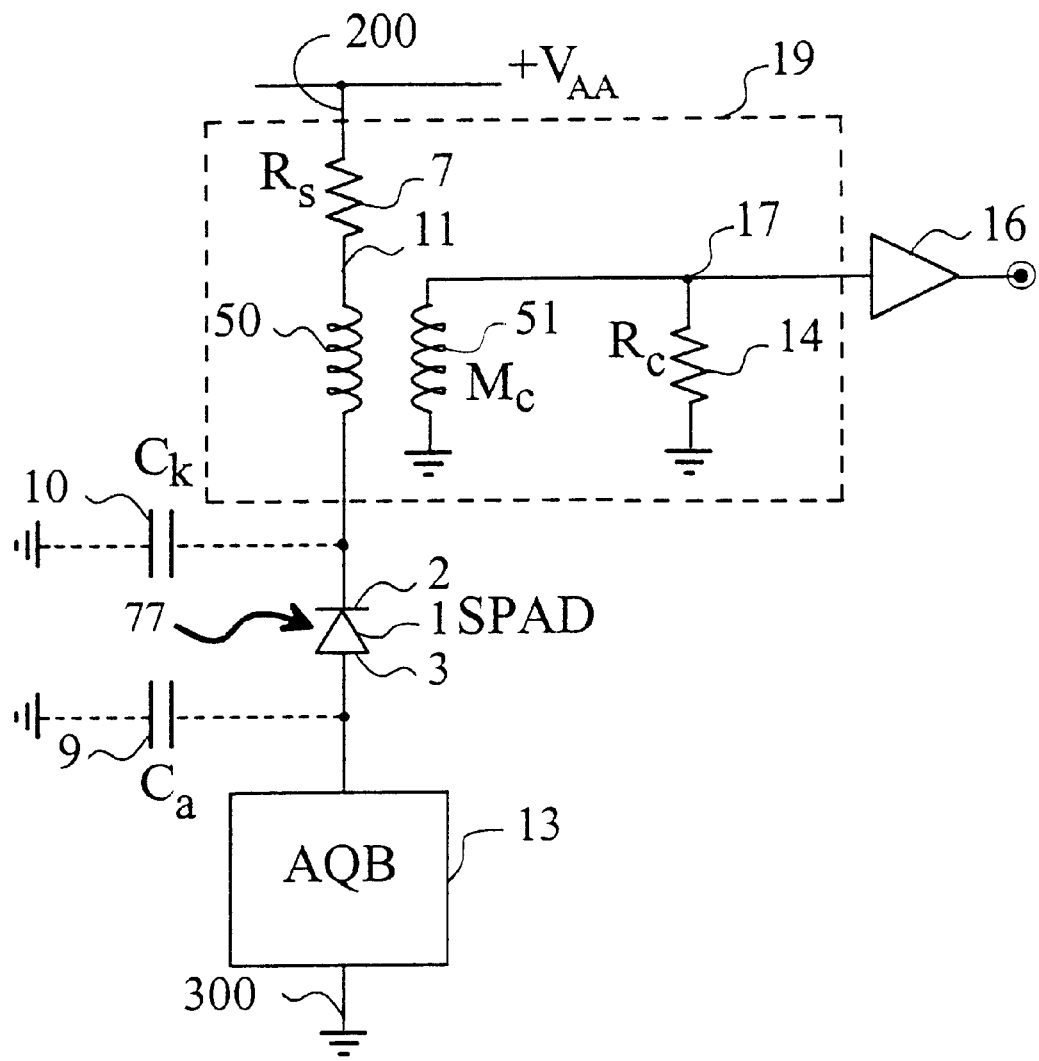
FIG. 9 shows a variant of the circuit of FIG. 6 according to the present invention with AC-coupling network for the avalanche pulse constituted by resistors and mutually coupled inductors.

A possible variant using an inductive coupling instead of capacitive coupling is shown in FIG. 9.

It can be noted in FIG. 9 that the coupling network in alternate current 19 uses instead of the capacitor 15 Cc of FIG. 6 two coupled inductors 50 and 51 with mutual inductance Mc. It can be seen that the first inductance is inserted in the connection between cathode 2 and the circuit node 200 connected to the bias voltage +VAA, in series with the signal resistor Rs and that the second inductor is connected between the input 17 of the comparator and ground, in parallel with the resistor 14 of coupling Rc. The mutually coupled inductors with characteristics suitable for the object can be made with two coupled windings of a few turns, which have low stray capacitance and a weak inductive coupling, efficient only at high frequencies. By using notions of known electronic art the said inductive coupling network can be designed so as to implement a high-pass cut-off with differentiating time constant of value between one and a few nanoseconds, as said above, and a low-pass cut-off at sufficiently high frequency, as said above.

The SPAD photodiode can be biased with a negative supply voltage −VAA instead of a positive one, applying said negative voltage −VAA to the circuit node 200 in FIG. 6 or FIG. 7 and at the same time inverting between them the connections of cathode 2 and anode 3, that is connecting the cathode 2 to the AQB (active quenching block) and the anode 3 to the terminal biased at voltage −VAA. The change in polarity of the bias voltage of course causes the change of polarity also of the signals with respect to what has been previously described.

The terminal of the SPAD photodiode connected to the AQB can be biased also at a positive or negative voltage different from ground, with value within the range permitted by the circuits that constitute the AQB.

It can be noted that a coupling network in alternate current with parameter values selected according to the present invention has the virtue of being suitable for being employed in all the avalanche quenching circuit configurations for SPAD photodiodes described in the technical and scientific literature, both with active quenching and with passive quenching.

What is claimed is:

1. Quenching and output circuit for a SPAD type photodiode suitable for producing a signal with a risetime of the leading edge almost as rapid as the intrinsic risetime of the avalanche current pulse within the SPAD, therefore in a time range from a few tens of picoseconds to some nanoseconds, and having a total duration in a time range from some nanoseconds to some tens of nanoseconds, said circuit comprising a comparator for detecting the avalanche pulse that has the input connected to an output point of a circuit block of coupling in alternate current, that has its input connected to a first terminal of the SPAD photodiode biased at high voltage, and means placed between ground and a second terminal of said SPAD for quenching the avalanche and taking out and counting signals, characterized in that the circuit elements present in said circuit block are such that they determine a filtering action which towards high frequencies shows a low-pass type frequency cut-off, with characteristic cut-off frequency preferably corresponding to a simple pole, that is to a simple integration time constant, and towards low frequencies a high-pass cut-off, with characteristic cut-off frequency preferably corresponding to a simple pole, that is to a simple differentiation time constant, and in that the values of the circuit parameters are selected so that the value of said high-pass cut-off frequency is less than said low-pass cut-off frequency and less than the bandwidth limit of the avalanche current pulse, but is greater than the value determined by the reciprocal of the duration of said pulse, that is that said differentiation time constant is greater than that of the integration and of the risetime of the avalanche current pulse, but is less than the duration of said pulse.

2. Circuit according to claim 1, characterized in that said circuit elements are dimensioned so that the value of said low-pass cut-off frequency is greater than the bandwidth limit of the avalanche current pulse or at least about equal to it, that is said integration time constant is less than the risetime of the avalanche current pulse or at least about equal to it.

3. Circuit according to claim 1, characterized in that said circuit block for biasing and coupling in alternate current is made up of resistive bias elements, placed between a cathode terminal of said SPAD and a supply line, and of capacitive and resistive coupling elements placed between said cathode terminal of said SPAD and ground, so that said differentiation time constant is given by the product of said capacitive elements with the result of the sum of said resistive coupling elements with the parallel of the said resistive bias elements and the internal resistor of said SPAD.

4. Circuit according to claim 3, characterized in that said differentiation time constant is included in a time range between 1 nanosecond and a few nanoseconds.

5. Circuit according to claim 1, characterized in that said circuit block of biasing and of coupling in alternate current is constituted by resistive bias elements, placed between a cathode terminal of said SPAD and a supply line, and by capacitive and resistive coupling elements, placed between said cathode terminal of said SPAD and ground, so that said integration time constant is given by the product of capacitive element by the result of the parallel between said resistive coupling elements and said resistive bias elements and said internal resistor of said SPAD.

6. Circuit according to claim 5, characterized in that said integration time constant has a time duration equal to or less than one nanosecond.

7. Circuit according to claim 1, characterized in that a circuit block of biasing and coupling in alternate current is constituted by resistive bias elements, placed in series with a first inductor and with a cathode terminal of said SPAD and a supply line, and with a second inductor mutually coupled with said first inductor placed between the input of a comparator and ground and resistive means of coupling, placed in parallel with said second inductor.

8. Circuit according to claim 7, characterized in that said coupled inductors and said resistive means are designed with values such that said differentiation time constant is included in a time range between 1 nanosecond and a few nanosecond.

9. Circuit according to claim 7, characterized in that said coupled inductors and said resistive means are designed with values such that said integration constant has a time duration equal to or less than one nanosecond.

10. Circuit according to claim 1 characterized in that said circuit block of biasing and of coupling defines a low threshold of said comparator so that said threshold is crossed by the first part of the rise of said avalanche pulse, in which the intrinsic fluctuations are smaller.

* * * * *

UNITED STATES PATENT AND TRADEMARK OFFICE
CERTIFICATE OF CORRECTION

PATENT NO.    : 6,384,663 B2
DATED         : May 7, 2002
INVENTOR(S)   : Cova et al.

It is certified that error appears in the above-identified patent and that said Letters Patent is hereby corrected as shown below:

<u>Title page,</u>
Item [73] should read -- POLITECNICO DI MILANO --

Signed and Sealed this

Sixteenth Day of July, 2002

Attest:

Attesting Officer

JAMES E. ROGAN
*Director of the United States Patent and Trademark Office*